(12) United States Patent
Scuffham et al.

(10) Patent No.: US 8,356,695 B2
(45) Date of Patent: Jan. 22, 2013

(54) METHOD AND APPARATUS FOR OILING SPLINES IN A BEVEL GEARBOX

(75) Inventors: Mark T. Scuffham, Richland, PA (US); Benjamin A. Heiser, Lititz, PA (US); Philip J. Ehrhart, Narvon, PA (US)

(73) Assignee: CNH America LLC, New Holland, PA (US)

( * ) Notice: Subject to any disclaimer, the term of this patent is extended or adjusted under 35 U.S.C. 154(b) by 547 days.

(21) Appl. No.: 12/620,532

(22) Filed: Nov. 17, 2009

(65) Prior Publication Data

US 2011/0113739 A1    May 19, 2011

(51) Int. Cl.
*F16H 57/04* (2010.01)
(52) U.S. Cl. .............. 184/6.12; 184/11.1; 184/11.2; 184/43
(58) Field of Classification Search ............. 56/12.3; 184/6.12, 11.1, 11.2, 43
See application file for complete search history.

(56) References Cited

U.S. PATENT DOCUMENTS

| | | | |
|---|---|---|---|
| 2,090,066 A | 8/1937 | Peterson | |
| 2,408,336 A * | 9/1946 | Orr | 184/6.12 |
| 2,681,126 A * | 6/1954 | Searls | 184/6.12 |
| 3,524,306 A | 8/1970 | Reber | |
| 3,954,121 A * | 5/1976 | Kardos | 137/854 |
| 4,068,740 A * | 1/1978 | Quinn et al. | 184/6.12 |
| 4,097,095 A * | 6/1978 | Zimmer | 384/465 |
| 4,190,116 A * | 2/1980 | O'Neal et al. | 173/38 |
| 4,292,876 A | 10/1981 | De Graan | |
| 4,365,462 A * | 12/1982 | Werner et al. | 56/255 |
| 4,480,492 A * | 11/1984 | Fujioka et al. | 74/467 |
| 4,759,234 A * | 7/1988 | Premiski et al. | 475/159 |
| 4,815,262 A * | 3/1989 | Koch et al. | 56/13.6 |
| 4,842,100 A * | 6/1989 | Cameron et al. | 184/6.2 |
| 4,903,538 A * | 2/1990 | ver der Lely et al. | 74/417 |
| 4,987,974 A * | 1/1991 | Crouch | 184/6.12 |
| 5,643,126 A * | 7/1997 | Hotta et al. | 475/159 |
| 5,830,098 A * | 11/1998 | Kimes | 475/159 |
| 5,875,619 A * | 3/1999 | McLean et al. | 56/6 |
| 5,996,323 A * | 12/1999 | Campbell et al. | 56/6 |
| 6,161,650 A * | 12/2000 | Ostergaard et al. | 184/13.1 |
| 6,223,859 B1 * | 5/2001 | Lindenthal | 184/11.2 |
| 6,732,837 B2 * | 5/2004 | Wittkopp | 184/7.4 |
| 6,843,348 B2 * | 1/2005 | Wittkopp | 184/7.4 |
| 6,918,492 B2 * | 7/2005 | Ostergaard | 209/326 |
| 7,438,090 B2 * | 10/2008 | Steele | 137/854 |
| 7,954,309 B2 * | 6/2011 | Ehrhart et al. | 56/13.6 |
| 8,122,787 B2 * | 2/2012 | Simpson et al. | 74/606 R |

FOREIGN PATENT DOCUMENTS

| | | |
|---|---|---|
| DE | 10335397 | 3/2005 |
| EP | 0058211 | 2/1981 |

* cited by examiner

*Primary Examiner* — Michael Mansen
*Assistant Examiner* — Michael Riegelman
(74) *Attorney, Agent, or Firm* — Patrick M. Sheldrake

(57) ABSTRACT

A method and apparatus for providing improved lubrication of a spline connection between a PTO driver and a bevel gearbox in which lubricant from the bevel gear housing is directed to a location above and radially outwardly from the splined connection and the apparatus then directs the lubricant flow toward the splined connection by force of gravity. The apparatus is configured to be self-aligning when installed in an existing receptacle in the gearbox housing thereby enabling the apparatus to be conveniently installed in a housing designed to utilize gearbox lubricant to lubricate the splines.

14 Claims, 4 Drawing Sheets

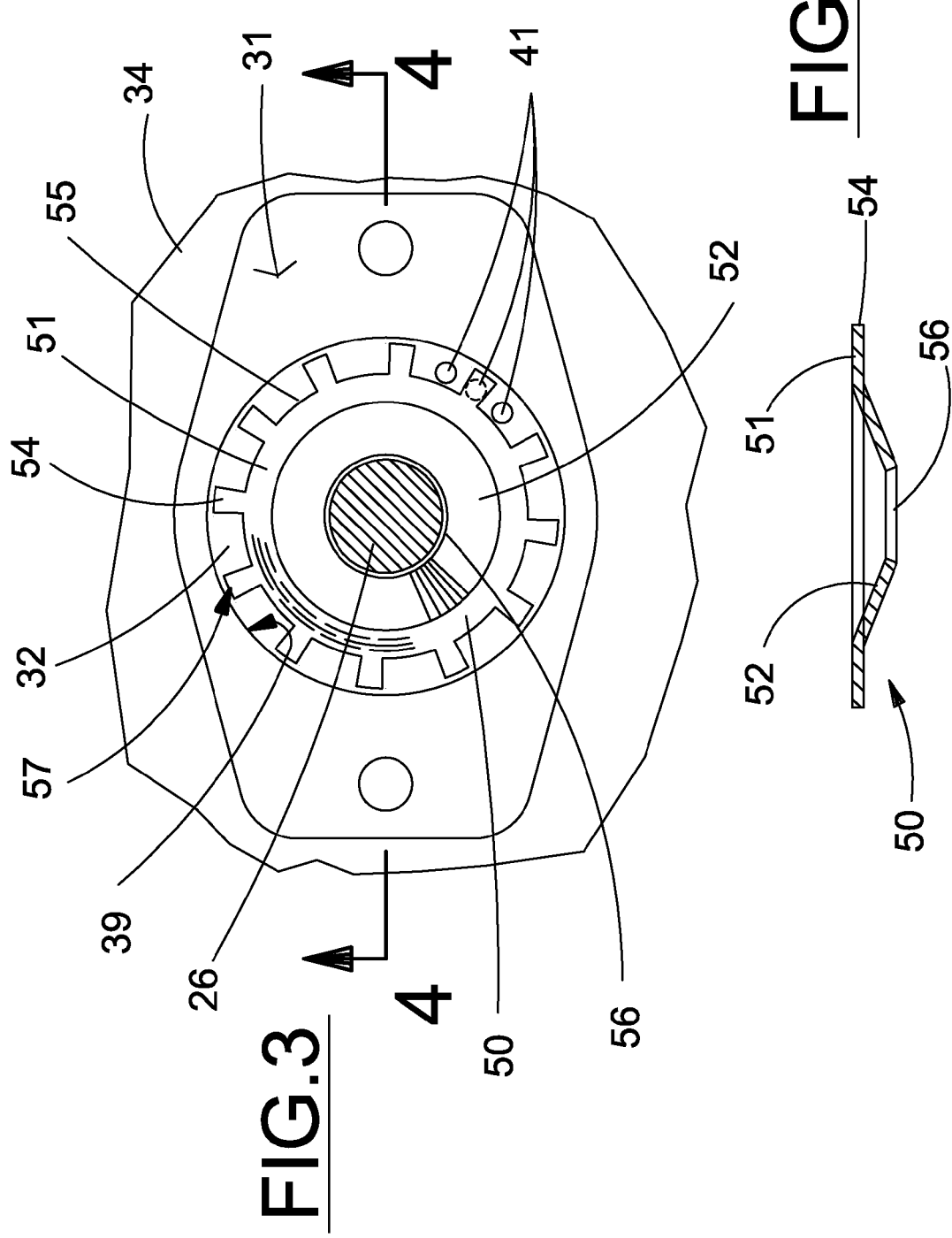

METHOD AND APPARATUS FOR OILING SPLINES IN A BEVEL GEARBOX

BACKGROUND OF THE INVENTION

This invention relates generally to a machine for severing standing crops from the ground to initiate a harvesting process and, more particularly, to a method and apparatus for oiling driveshaft splines connecting a power take-off shaft to a bevel gearbox.

Disc cutterbars used on agricultural harvesters typically comprise at least one power take-off, usually in the form of a hydraulic motor, to drive the cutterbar. The hydraulic driver is typically connected to a gearbox to enable power to be delivered to multiple inputs on the cutterbar. Mechanical drives are favored to enable synchronization of all rotating disc cutters on the cutterbar; such mechanical drives feature bevel gearboxes to allow transverse shafts to be provided for powering the cutterbar at multiple transverse locations. Newer gearbox designs feature an integral connection for the PTO driver featuring a splined connection between the driver shaft and the top bevel gear for the connection. Lubrication of the splined connection has proven difficult in many applications. Grease was conveniently used to lubricate the splined connection, but was susceptible to being displaced from the connection resulting in spline fretting, corrosion, and eventually failure of the splined connection.

It would be advantageous to have a PTO driver to gearbox connection that would enable oil from the gearbox cavity to provide effective lubrication to the splined shaft connection area. Further advantages would be realized by a lubrication design that could be easily incorporated into existing gearbox designs thereby enabling improved shaft spline lubrication with minimal impact on header production and easily implemented as a retrofit.

SUMMARY OF THE INVENTION

Accordingly, the present invention, in any of the embodiments described herein, may provide one or more of the following advantages:

It is an object of the present invention to provide an apparatus and method for lubricating the splines connecting a PTO driver to a bevel gearbox using a lubricant contained within the gearbox.

It is a further object of the present invention to provide an apparatus for lubricating the splines connecting a PTO driver to a bevel gearbox that can be installed in an existing gearbox configuration and improve the lubricating capability of the apparatus.

It is a further object of the present invention to provide an apparatus for lubricating the splines connecting a PTO driver to a bevel gearbox that is configured to be self-aligning when installed thereby assuring proper lubricant flow to the splines.

It is a still further object of the present invention to provide an improved drive spline lubrication method and apparatus for use in the splined connection between a PTO driver and a bevel gearbox that is durable in construction, inexpensive of manufacture, carefree of maintenance, easily assembled, and simple and effective to use.

These and other objects are achieved in accordance with the instant invention by providing a method and apparatus for providing improved lubrication of a spline connection between a PTO driver and a bevel gearbox in which lubricant from the bevel gear housing is directed to a location above and radially outwardly from the splined connection and the apparatus then directs the lubricant flow toward the splined connection by force of gravity. The apparatus is configured to be self-aligning when installed in an existing receptacle in the gearbox housing thereby enabling the apparatus to be conveniently installed in a housing designed to utilize gearbox lubricant to lubricate the splines.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a partial plan view of the gearbox shown in FIG. 2 detailing the relationship between the gearbox housing and one embodiment of a deflector for directing lubricant toward the spline connection;

FIG. 4 is a cross-sectional view taken along line 4-4 of FIG. 3 showing the configuration of one embodiment of the deflector.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
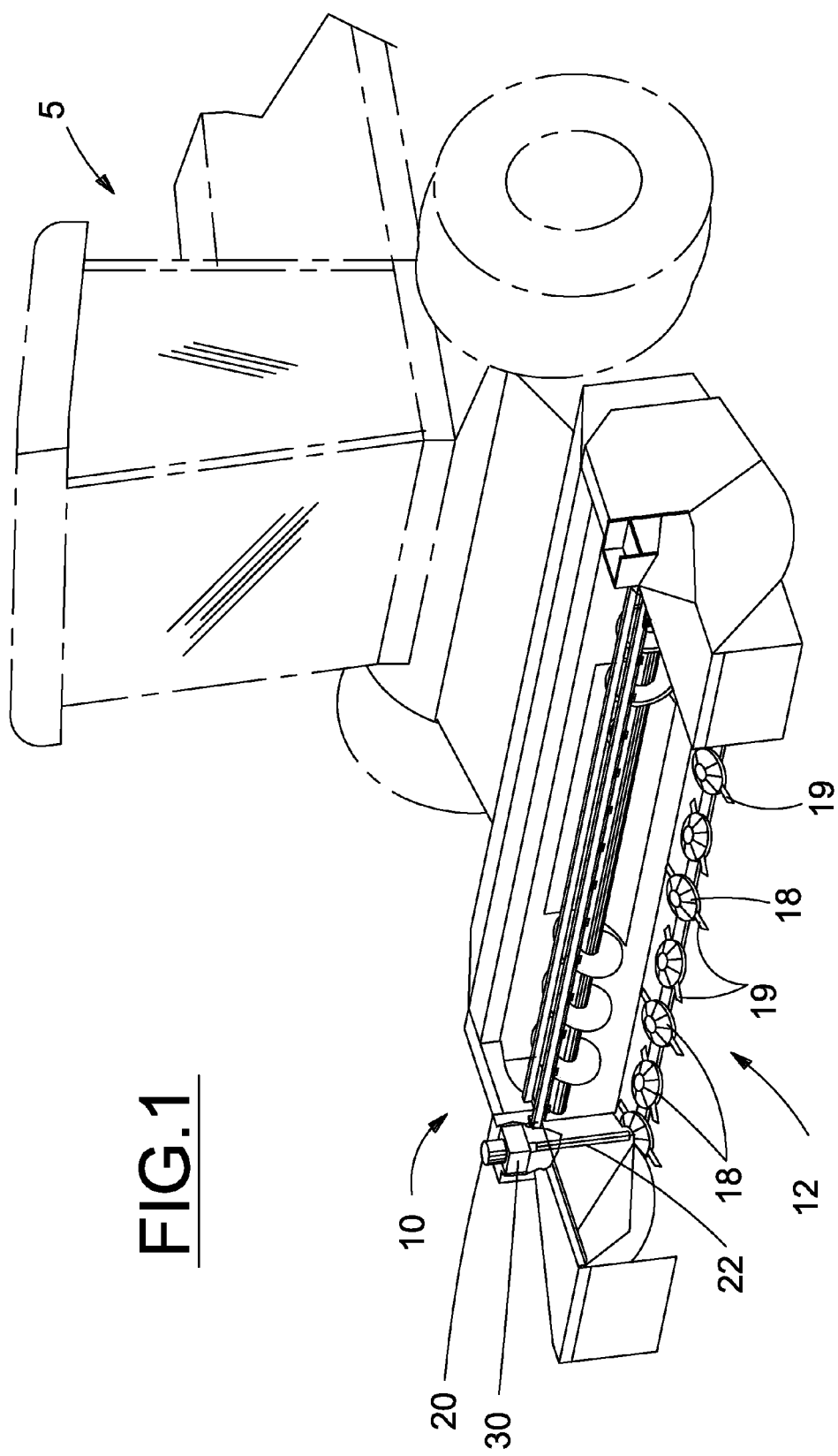
FIG. 1 is a partial perspective view of a self-propelled agricultural windrower having a header of the type on which the present invention is useful.

Referring now to the drawings and particularly to FIG. 1, an agricultural windrower 5 having a header 10 with a rotary disc-type cutterbar 12 of the type on which the present invention finds utility is presented. Disc cutterbars have been utilized in agricultural harvesting implements for many years and are well known in the art. Each disc cutterbar includes a plurality of transversely spaced rotary disc cutter modules 18 driven for rotation about a generally vertical axis. Each disc cutter module 18 has two or more knives 19 pivotally mounted on the periphery thereof to sever standing crop from the ground through an impact action. The cutterbar 12 is transversely arranged on the header with a pair of opposing outboard ends. The discs are generally powered by a PTO driver 20 through gearbox 30 and one or more drive shafts 22 rotationally connecting the driver 20 to the rotary cutter modules 18. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Figure 2:
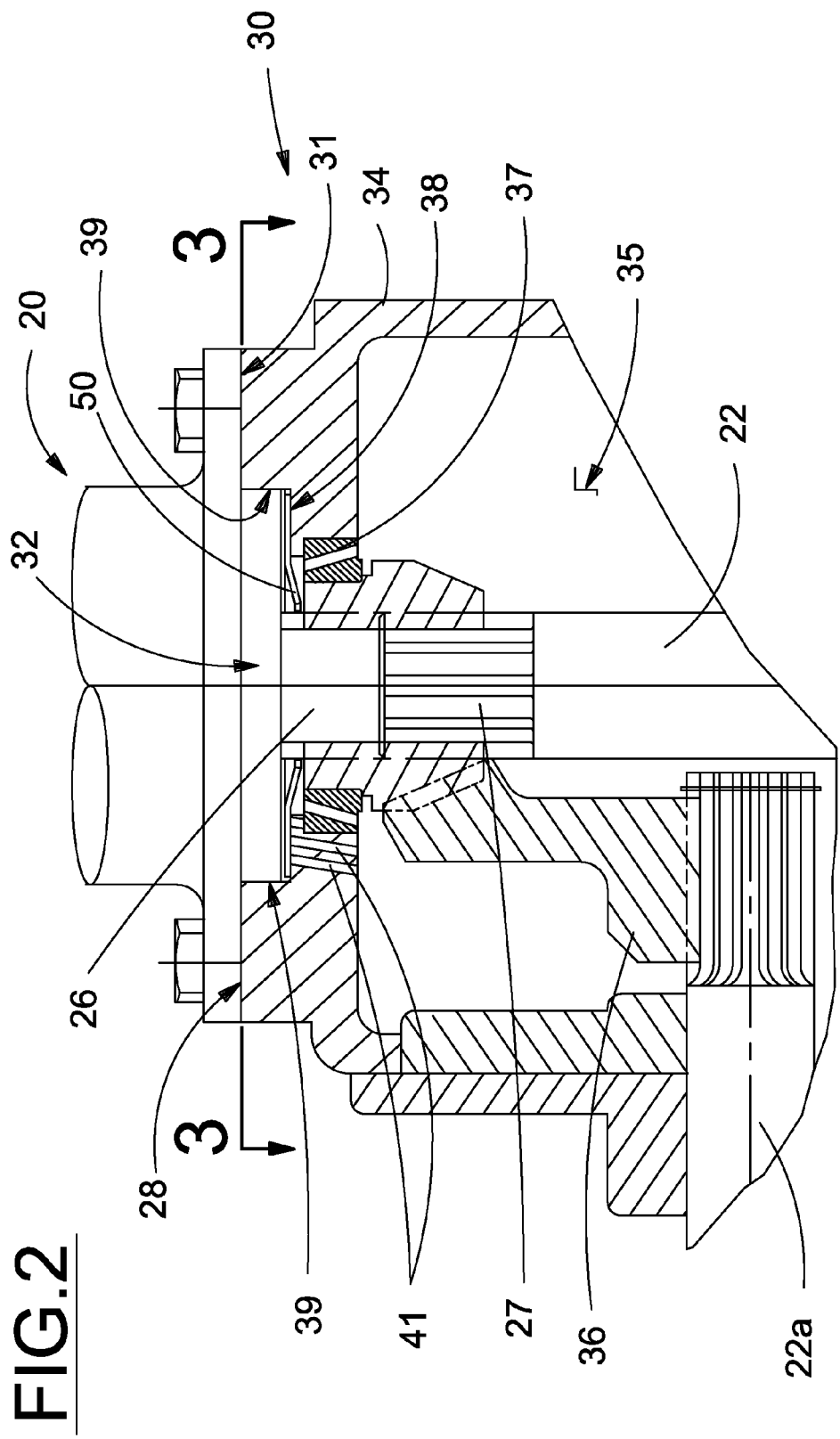
FIG. 2 is a partial section view of a gearbox housing used in a rotary disc cutterbar of a windrower header showing the lubricant passageways and for providing lubricant to a spline connection between the PTO driver and the gearbox.

Now referring to FIG. 2, gearbox 30 further comprises a generally hollow cast housing 34 having a specific shape to retain a low profile and to establish an oil reservoir 35 therewithin to enclose the bearings 37, cutter drive shaft 22, auxiliary shaft 22a, and bevel gear 36. Bevel gear 36 is used to power auxiliary output shaft 22a which provides motive power to non-cutterbar loads on the header, such as crop converging apparatus and/or conditioner rolls. PTO driver 20 is connected to gearbox 30 at a flanged interface 28, 31. The flanged interface also seals the opening to oil reservoir 35 which allows lubricant from the reservoir to be used to lubricate the upper bearing 37 and the axially displaceable shaft connection, or coupling 27 between the PTO driver shaft 26 and the gearbox drivetrain. In the embodiment shown, coupling 27 is a spline connection; however, skilled artisans will recognize that any shaft coupling configured to transfer torque while allowing relative axial movement between the shaft and shaft receptacle will benefit from the present invention.

Known axially moveable shaft connections typically rely on a grease-filled housing surrounding the connection and a separate oil-filled housing for the bearings and gears. By combining the housings, the shaft connector (i.e., splines) may utilize oil from the gear housing as lubrication, avoiding common problems retaining grease where it is needed in the rotating shaft connection. The size of the overall gearbox housing, specifically, the coupling area, may also be reduced. Another advantage is that a splined end connection on the driver may be engaged with a spline receptacle incorporated into the bevel gear 36 itself. This configuration eliminates the need for a separate coupling between shaft ends and enables the overall height of the gearbox drive housing to be reduced. Lubricant from the gear oil reservoir 35 is directed into a cavity 32, referred to as the motor pilot cavity, through one or more conduits 41 by "splashing" action of the bevel gear 36 in the lubricant contained in reservoir 35. Multiple cylindrically shaped conduits are preferred for ease in manufacturing. In another embodiment, a single, relatively large diameter or a non-circular shaped conduit may be used. The conduits 41 are ideally aligned with the outer periphery of bevel gear 36 so that a portion of the oil slung from the gear by centrifugal force will be directed into the conduits 41. Cavity 32 is a generally circular recess into the structure of housing 34, having a perimeter 39 and a generally perpendicularly aligned lower surface 38. Cavity 32 is generally symmetrically aligned with driver shaft 26.

The configuration of the motor pilot cavity 32 is such that much of the lubricant directed thereto is gravity normally directed toward bearing 37. Operating experience has shown that this condition tends to leave the shaft spline interface 27 under lubricated as the majority of the lubricant flowed through bearing 38 before reaching the spline interface 27. The present invention alleviates this shortcoming by positioning a deflector 50 into the motor pilot cavity to direct the flow of lubricant inwardly toward the shaft spline interface area 27. As the present invention relies on gravity to produce lubricant flow once directed into the motor pilot cavity, the invention is primarily directed toward application on generally vertically oriented shafts. The angular limits of deflection from vertical are generally similar to those of the angular inclination of the conical portion 52 of the deflector 50 with respect to the base plane of the annular structure as described below.

Figure 5:
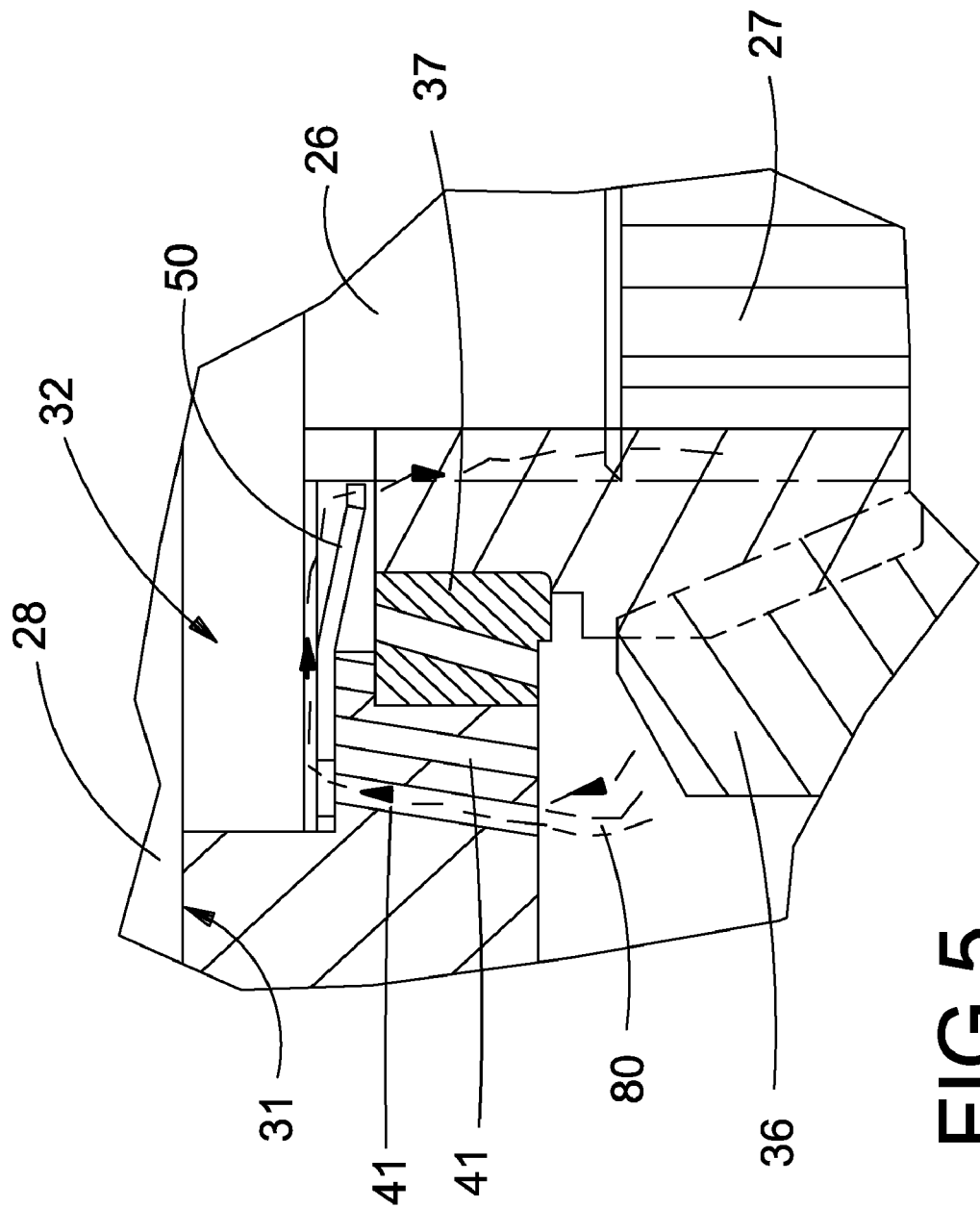
FIG. 5 is a partial section view of the gearbox housing shown in FIG. 2 detailing the lubricant flow paths.

Referring to FIGS. 3 through 5, the deflector 50 is shown positioned in the motor pilot cavity 32. Deflector 50 features an interior aperture 56 through which driver shaft 26 protrudes while maintaining a small annular gap therebetween through which lubricant may flow. Deflector 50 comprises an intermediate annular structure 51 from which a plurality of radially extending, spaced apart tabs 54 extend to form an outer periphery 57. Outer periphery 57 is configured to fit within the diameter of cavity 32, defined by outer cavity wall 39. Tabs 54 are circumferentially separated by recesses 55 giving the outer periphery 57 a segmented appearance. Intermediate annular structure 51 and tabs 54 are generally coplanar and arranged in a generally circular configuration. The recesses 55 are configured so that regardless of the rotational orientation of deflector 50 in the cavity 32, at least two of the oil conduits 41 will be aligned in one or more recesses 55 so that the flow of lubricant 80 through the conduits 41 will be allowed to pass to the upper surface of the deflector 50. In embodiments using only a single conduit to pass oil into the pilot cavity, the relative proportions of recesses 55 to tabs 54 must be configured so that the width of the tabs 54 is less than the diameter of the conduit so that regardless of deflector 50 position, a portion of the oil flow through the conduit 41 will reach the upward facing surface of the deflector. The configuration allows deflector 50 to be rotationally positioned in cavity 32 in any position surrounding shaft 26 without the need to provide a structure to position the deflector in a specific rotational alignment.

A conical portion 52 extends radially inwardly from intermediate periphery 51 toward aperture 56 and is angled relative to the plane of intermediate periphery 51 so that lubricant splashed onto the upper surface of the deflector 50 is directed inwardly toward aperture 56 by the force of gravity from where it may then flow by gravity toward the splined connection 27 of shaft 26. Deflector 50 is easily positionable in pilot cavity 32 without modification to the cavity, minimizing the cost of providing effective spline lubrication. Additional improvements in the control of lubricant flow across the upper surface of the deflector may possible through surface treatment of the deflector. While the preferred embodiment is formed from stamped metal, incorporating grooves or other flow directing features onto the surface are envisioned to better manage lubricant flow.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In a gearbox for driving a cutterbar of an agricultural header, the gearbox having a main housing with an interior portion containing at least one drive gear and configured for holding lubricant and a shaft connected to the at least one drive gear by an axially displaceable connector, the shaft extending generally vertically therefrom along an axis, the improvement in the gearbox comprising:

a pilot cavity disposed generally above the interior portion;

an opening within the housing between the interior portion and said pilot cavity, said opening arranged along said axis and allowing passage of the shaft and the lubricant between the interior portion and said pilot cavity;

at least one conduit extending through the housing from the interior portion to said pilot cavity for conveying the lubricant to said pilot cavity;

a lubricant deflector having a central axis and a generally planar annulus from which a plurality of tabs extend to define an outer periphery, each of said plurality of tabs having a width and being spaced apart from the adjacent tab creating a gap therebetween, an aperture aligned on said central axis, and a tapered portion extending downward from the annulus to the aperture; and;

wherein said tabs are configured to sit in said pilot cavity and configured such that a portion of said at least one conduit is unobstructed by said deflector maintaining a flow path from the interior portion through the conduit and past an upper surface of the deflector toward the aperture.

2. The improvement of claim 1, further comprising a plurality of conduits extending from the interior portion to said pilot cavity, wherein said plurality of tabs is configured such that at least one of said plurality of conduits remains unobstructed by said plurality of tabs on said deflector, regardless of the rotational position of said deflector in said pilot cavity.

3. The improvement of claim 1, wherein said aperture has a diameter greater than the diameter of the shaft thereby creating an annular opening therebetween.

4. The improvement of claim 3, wherein said plurality of tabs symmetrically disposed around said outer periphery and have generally planar lower surfaces with one another.

5. The improvement of claim 3, wherein the shaft is rotatable with respect to the deflector.

6. The improvement of claim 1, wherein said conduit is positioned in alignment with a periphery of a gear located in the main housing.

7. A lubrication system for a gearbox comprising a gearbox housing comprising at least one vertically oriented shaft disposed within, the housing configured for containing lubricant and having a first interior portion and a second interior portion disposed above the first interior portion, at least one conduit extending within the housing between the first interior portion and said second interior portion, and an opening within the housing through which the shaft extends from the first to the second interior portion; and a lubricant guide comprising a generally planar base structure having a central axis, an interior periphery, and an exterior periphery, said interior and exterior peripheries symmetrically disposed about said central axis;

a plurality of positioning structures extending radially outwardly from said exterior periphery, said plurality of positioning structures configured to define an outer perimeter, said plurality of positioning structures having a plurality of gaps in said outer perimeter between adjacent positioning structures, wherein the positioning structures are positioned to allow at least a portion of lubricant flow to pass through the at least one conduit; and a deflector formed from a surface extending from said interior periphery downwardly and radially-inwardly to an aperture and forming a conical structure centered on said central axis;

wherein said positioning structures are positioned to provide support to the lubricant guide in the second interior portion and the deflector configured to direct a flow of lubricant from the at least one conduit to flow inwardly toward said aperture.

8. The system of claim 7, further comprising a plurality of conduits extending from the interior portion to the second interior portion, wherein said plurality of positioning structures is configured such that at least one of said plurality of conduits remains unobstructed by said plurality of positioning structures, regardless of the rotational position of said apparatus in the second interior portion.

9. The system of claim 7, wherein said aperture has a diameter greater than the diameter of the shaft thereby creating an annular opening therebetween when said lubricant guide is operationally positioned in the second interior portion.

10. The system of claim 7, wherein the shaft is rotatable with respect to the deflector.

11. The system of claim 7, wherein said plurality of positioning structures is symmetrically disposed around said exterior periphery.

12. A method for oiling coupling connection in a vertically oriented shaft disposed along an axis in a gearbox housing, the housing having a first interior portion containing a volume of lubricant, a second interior portion disposed above the first interior portion and above the coupling connection, the method comprising the steps of:

providing at least one conduit extending through the housing between the first and the second interior portions aligned above a movable component of the gearbox, providing an opening in the housing through which the shaft extends from the first interior portion through the second interior portion toward the exterior of the housing;

providing a lubricant guide having a generally base structure, an interior periphery, and an exterior periphery, each said periphery symmetrically disposed about the axis, the guide further having a plurality of positioning structures extending radially outwardly from the exterior periphery to define an outer perimeter, the plurality of positioning structures by a plurality of gaps between adjacent positioning structures, a deflector extending radially inwardly from said interior periphery, the deflector angled from the base structure to create a conical structure centered on the axis, and a generally circular aperture in the deflector centered on the axis;

positioning the lubricant guide in the second interior portion such that the shaft extends through the aperture and the deflector is angled downwardly toward the shaft; and operating the gearbox, such that movement of the component directs lubricant from the first interior portion through the at least one conduit to the second interior portion whereupon a portion of the lubricant passes through at least one of the plurality of gaps onto an upward-facing surface of the lubricant guide and toward the aperture and the coupling connection on the shaft.

13. The method of claim 12, wherein the step of providing at least one conduit includes providing a plurality of conduits extending between the first and the second interior portions; the method further comprising the steps of:

configuring the plurality of positioning structures in a manner such that no more than one of the plurality of conduits is obstructed by the plurality of positioning structures regardless of the rotational orientation of the guide.

14. The method of claim 12, wherein the component is a gear and the at least one conduit is positioned in alignment with the periphery of the gear located in the housing.

* * * * *